United States Patent [19]
Wood

[11] Patent Number: 6,007,372
[45] Date of Patent: Dec. 28, 1999

[54] GPS POWER/DATA CABLE SYSTEM

[75] Inventor: Craig S. Wood, Gorham, Me.

[73] Assignee: DeLorme Publishing Co., Yarmouth, Me.

[21] Appl. No.: 08/931,664

[22] Filed: Sep. 16, 1997

Related U.S. Application Data

[60] Provisional application No. 60/026,230, Sep. 18, 1996.

[51] Int. Cl.⁶ .................................................. H01R 11/00
[52] U.S. Cl. ............................................................. 439/502
[58] Field of Search ................................... 439/502, 638, 439/650, 652

[56] References Cited

U.S. PATENT DOCUMENTS

| | | | |
|---|---|---|---|
| 4,941,845 | 7/1990 | Eppley et al. ........................... | 439/502 |
| 5,177,665 | 1/1993 | Frank et al. .............................. | 439/502 |
| 5,448,773 | 9/1995 | McBurney et al. ...................... | 455/343 |
| 5,497,339 | 3/1996 | Bernard .............................. | 364/705.05 |
| 5,517,683 | 5/1996 | Collett et al. ............................. | 455/89 |
| 5,528,248 | 6/1996 | Steiner et al. .......................... | 342/357 |
| 5,532,524 | 7/1996 | Townsley et al. ........................ | 307/64 |
| 5,599,204 | 2/1997 | Glassford ................................. | 439/502 |
| 5,675,524 | 10/1997 | Bernard .............................. | 364/705.05 |

FOREIGN PATENT DOCUMENTS 2-288176  11/1990  Japan .

OTHER PUBLICATIONS

Excerpts from "Universal Serial Bus Specification" Rev. 1.1, Sep. 23, 1998 from www.usb.org/developers/download.html.

*Primary Examiner*—Steven L. Stephan
*Assistant Examiner*—T C Patel
*Attorney, Agent, or Firm*—Pierce Atwood; Chris A. Caseiro

[57] ABSTRACT

A device for coupling global positioning system (GPS) receivers to computer systems in a way that takes advantage of available power supplies. The device includes an adaptive power base that may be used to replace the standard battery-pack bases of many portable GPS receivers. The adaptive power base is coupled through an interface cabling system to an external power supply. The power supply may be associated with the computer means, such as a mouse or keyboard port, or it may be a completely separate source, such as an automobile's cigarette lighter outlet. The interface cabling system includes couplings for linking the data communications ports of the GPS receiver and the computer system together. Through the design of the present invention, the GPS receiver is more adaptive to available power sources and therefore may be used for longer periods of time and in a variety of locations. The design is simple in that it includes standard connectors.

4 Claims, 5 Drawing Sheets

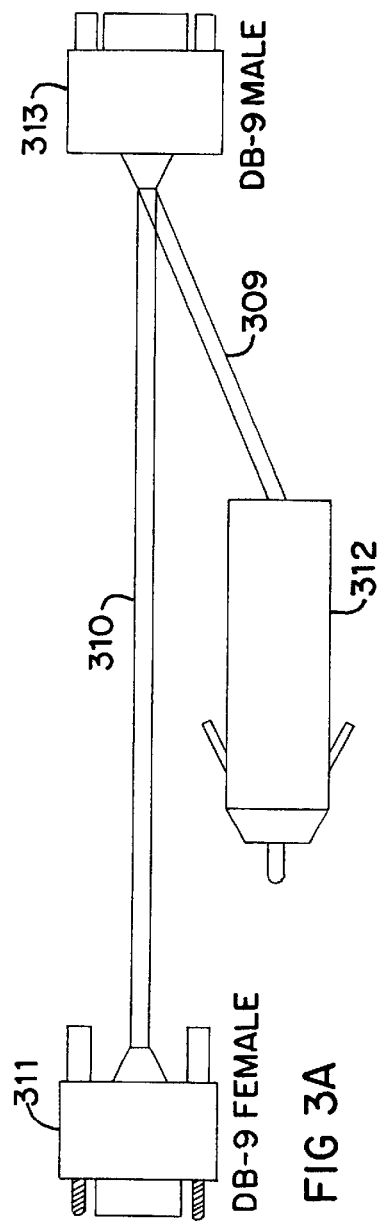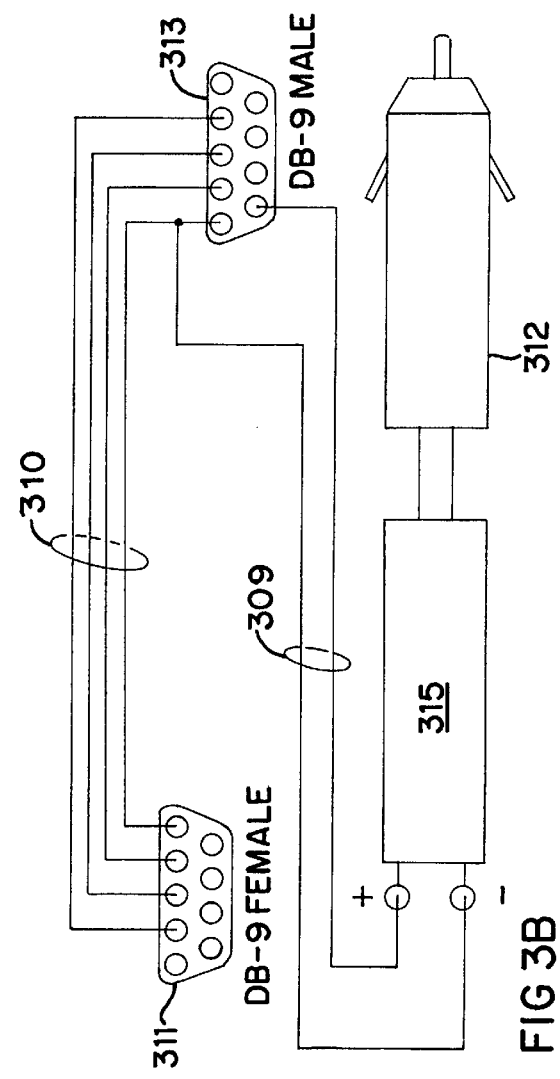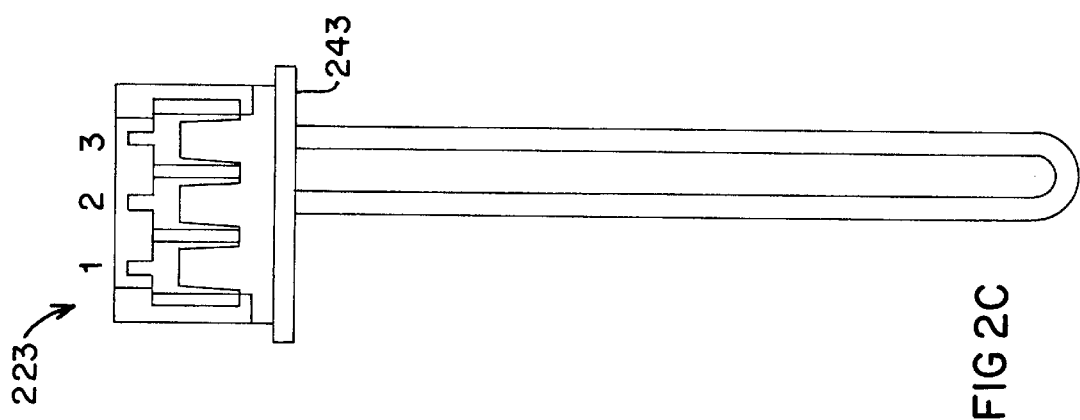
FIG 3A
FIG 3B
FIG 2C

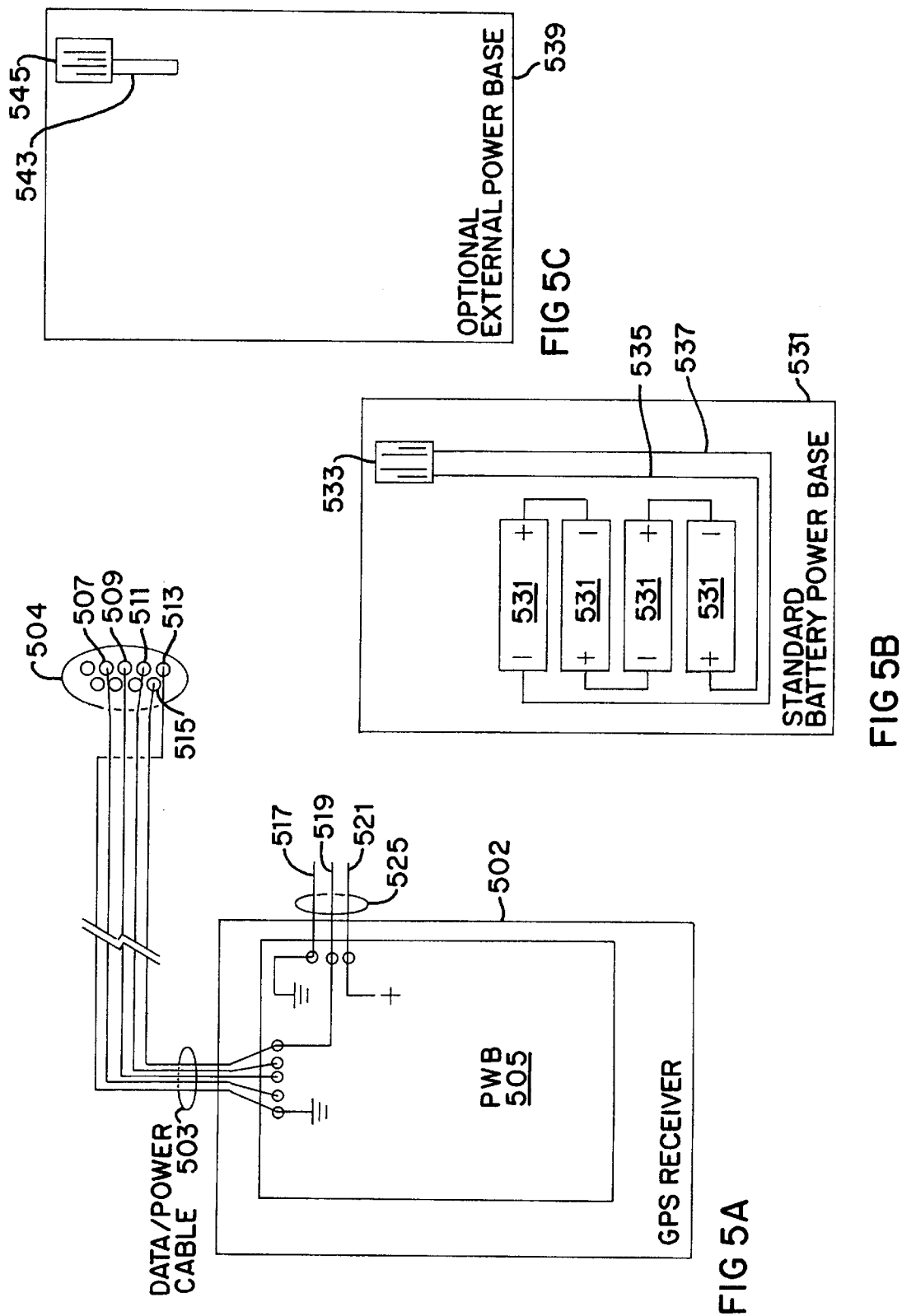

GPS POWER/DATA CABLE SYSTEM

CROSS-REFERENCE TO RELATED APPLICATION

This application claims the benefit of U.S. Provisional Application Ser. No. 60/026,230 filed on Sep. 18, 1996, of the same title.

BACKGROUND OF THE INVENTION

1. Field of the Invention

The present invention relates to position sensor devices such as Global Positioning Satellite (GPS) receivers as portable personal computer (PPC) accessories or peripherals. More particularly, the present invention relates to the coupling of such receivers and computers for data transfer and for supplying power.

2. Description of the Prior Art

In this disclosure, "portable personal computer" or "PPC" includes state-of-the art laptop, notebook and personal digital assistant (PDA) personal computers. In a typical embodiment, geographical information, mapping and/or travel information software is being used on the PPC typically in a vehicle or by the user on foot or at a remote location absent conventional "house current" such as 110 volt AC electrical power outlets standard in residences and workplaces in the United States. Use of the geographic software is enhanced by "real-time" geographic coordinate data supplied by a GPS receiver, for example, the latitude/longitude (lat/long) for the user's present location. For example, in conjunction with a GPS receiver, the PPC can display and update the user's location on computerized maps or in other geographic information formats.

To function as peripheral accessories in conjunction with a PPC, state-of-the art GPS receivers need an electric power source, typically, within the ranges of 4 to 40 volts DC and 0.1 to 3.0 amps DC. A data link, typically a serial data input/output cable, is also required for communication between the GPS receiver and the PPC of the standard lat/long, speed, direction of travel and precise time signals or data as well as initialization routines and other data exchange. What is needed is a device that facilitates the necessary electrical power supply to the GPS receiver along with the data connection or link between the GPS and PPC through a system or set of options which address the needs of non-technical users in the major settings of in-vehicle and remote portable use.

SUMMARY OF THE INVENTION

It is an object of the present invention to provide a system capable of supplying power from several sources and also capable of providing data communication interfacing. That is, the present invention is designed to enable use of GPS as a PPC accessory in the typical settings of portable computer usage—such as use in a remote setting or in the field or "on foot" without any external electric power supply, and/or in a vehicle such as an automobile or small marine craft equipped with typically a standard 6 to 12 volt DC power supply available by means such as "cigarette lighter" receptacles or outlets, and/or temporary usage as a "desktop" personal computer in typical home or workplace settings with external power provided to the PPC by means of a 110–120 volt AC to 6–12 volt DC transformer/adapter. Furthermore, the present invention is designed to enable "easy" changeover between settings: e.g. shifting from "desktop" use at the office or in the home to in-vehicle use and/or changing from a reliable set-up in the user's car or boat to completely "free" or remote portable use in the field with the GPS receiver powered either by its own standard batteries or by the PPC battery pack. It is desirable to provide alternative power sources for the GPS receiver to conserve the PPC batteries in remote settings. But, at the same time, options for powering the GPS through the PPC external or internal power supply are useful for longer periods of operation in a vehicle, for example, or in case the standard GPS batteries wear out while PPC battery power still happens to be available, and so forth.

A main object of the present invention, therefore, is first to enable the unsophisticated user to connect up the GPS receiver peripheral or accessory to typical PPCs with minimal effort and technical challenge using fairly familiar equipment like standard batteries and communications or COM port cabling and connections. A second object is to provide for longer periods of operation and easy installation and shifting between regular in-vehicle use and use on foot or in a remote location by means of various accessory power and data cable options, typically provided as extra kit at low-cost. A third object is to avoid damage to the standard GPS battery power supply due to accidental connection to an external power source.

BRIEF DESCRIPTION OF THE DRAWINGS

FIG. 2C is a diagrammatic view of an external power cable for coupling to the optional removable external power base or bottom cover.

FIG. 3A is an external physical layout of the first type of optional accessory data/power cable and fittings for powering the GPS from an external power source such as a 9–12 volt DC cigarette lighter outlet in a boat or car.

FIG. 3B is a schematic wiring and pin diagram of the first type of optional accessory cable and fittings shown in FIG. 3A.

FIG. 5A is a physical layout schematic wiring diagram of the jumper arrangement or three-position male connector for power source on GPS printed wiring board or PWB, facilitating safe and ready connection to alternative GPS bottom covers or power bases—plus a schematic wiring diagram of standard GPS data/power cable and fitting.

FIG. 5B is a physical layout schematic wiring diagram of the standard battery power base for GPS receiver, showing the three-position female connector.

FIG. 5C is a physical layout schematic wiring diagram of alternative, optional external power base for the GPS receiver, showing the three-position female connector.

DESCRIPTION OF THE PREFERRED EMBODIMENT AND THE BEST MODE OF THE INVENTION

Figure 1A:
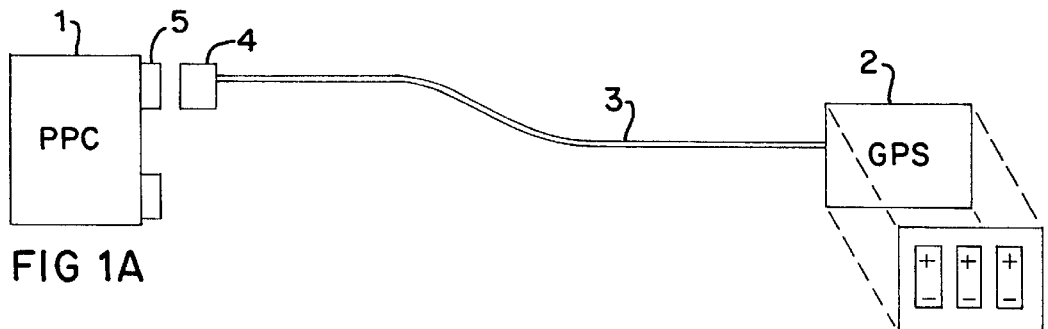
FIG. 1A is a diagrammatic perspective view of the basic simple set-up of the system of the present invention with the GPS internally powered by standard batteries and a data communication cable connection to a COM port on the PPC (portable personal computer).
Figure 1B:
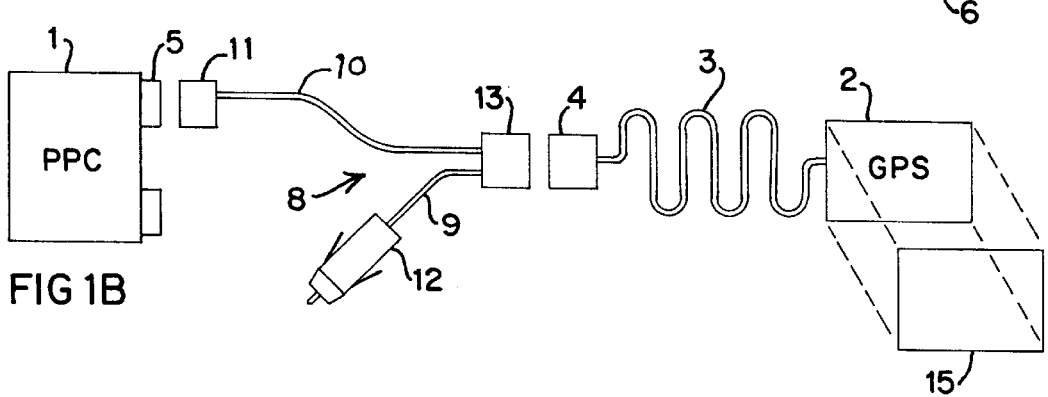
FIG. 1B is a diagrammatic perspective view of the first type of alternate optional cable, providing data communications between GPS and a COM port of the PPC, plus electric power for the GPS from a typical external source, such as a vehicle cigarette lighter outlet, and to the GPS receiver with an alternative external power base attached.
Figure 1C:
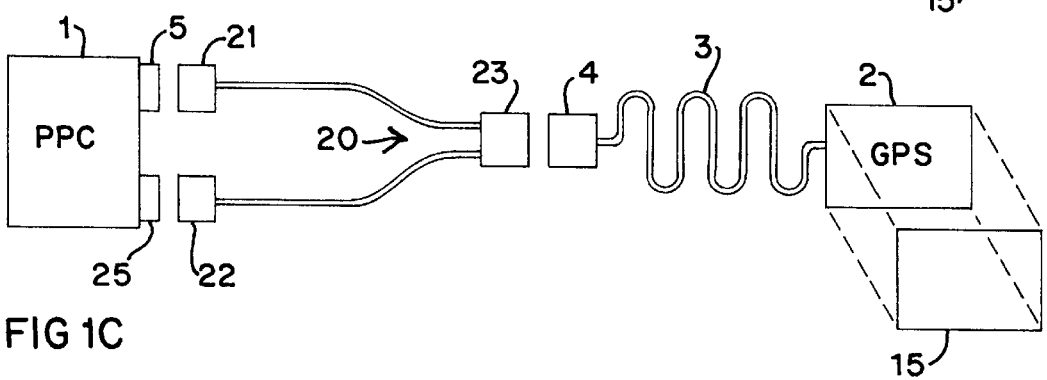
FIG. 1C is a diagrammatic perspective view of the second kind of alternate optional accessory cable, providing data communications between GPS and a COM port of the PPC, plus electric power for the GPS from the standard mouse/keyboard port of the PPC to the GPS receiver with an alternative external power base attached.

FIGS. 1A, 1B and 1C show simplified overviews of electric power and data cabling alternatives to link a PPC 1 with a GPS receiver 2. The GPS receiver has a standard data/power cable 3 and connector fitting 4 attached—as detailed further relative to FIG. 5A hereinafter.

FIG. 1A reveals the simplest cabling arrangement in which electric power is provided to the GPS receiver 2 by means of a removable standard battery power base 6. Data communications between the PPC 1 and the GPS receiver 2 are provided by the data/power cable 3 by making a standard connection between the attached fitting 4 and the COM port 5 on the PPC 1. Note that the electrical power transmission capability built into the data/power cable 3 is not actually used in the arrangement shown in FIG. 1. The cabling arrangement in FIG. 1 functions for remote use of the linked GPS and PPC i.e. in the absence of an external power source. It also provides for a ready and easy installation for technically unsophisticated users who are nonetheless familiar with standard batteries such as "AA" batteries available at most retail stores and their installation in everyday portable appliances, toys, radios and so forth. The user only needs further to understand or learn how to manage the simple COM port connection at 4 and 5, comprising one of the most common and easy personal computer cable connecting tasks. Thus, FIG. 1A illustrates a data/power cabling arrangement preferred for the basic mass-market PPC peripheral GPS receiver product.

FIGS. 1B and 1C illustrate additional data/power cabling alternatives for supplying external electrical power to the GPS receiver 2 functioning as a PPC peripheral. Both electric power and data signals are transmitted through the standard data/power cable 3 attached to the GPS receiver 2. The alternatives pictured in FIGS. 1B and 1C also require another accessory, namely, an alternative removable external power base 15 as installed by the user on the GPS receiver 2 in place of the standard battery power base 6 in FIG. 1A. Further details are provided below in this disclosure relative to FIGS. 2A, 2B, 5A, 5B and 5C.

FIG. 1B particularly shows a first optional added cable 8 with a separate power cable 9 and fitting or connector 12, plus a separate data cable 10 and fitting or connector 11. The separate power and data lines are joined in a "Y" configuration at an adaptation connector or fitting 13—such that both power and data are fed through the standard data/power cable 3 attached to the GPS receiver 2. The optional cable 8 transmits data between the GPS receiver 2 and the PPC 1 by connecting to the PPC COM port 5 at 11. External electric power is supplied at 12, for example, by a standard connector, plug or fitting for use with a cigarette lighter receptacle or outlet as commonly found in automobiles and other personal vehicles. Thus, the FIG. 1B cabling alternative 8 facilitates an external power source for the GPS receiver 2 for extended use or in case standard replaceable batteries for the GPS receiver 2 have worn out, for example, for use of the GPS receiver 2 as a PPC peripheral in a vehicle.

FIG. 1C specifically illustrates a second optional, added cable 20 also joined in a "Y" configuration at a GPS end or connector at 23. Data transmission between the GPS receiver 2 and the PPC 1 is also facilitated by another COM port connection at 21 and S. But, the electric power for the GPS receiver 2 is provided in FIG. 1C by connection at 22 to the extra keyboard/mouse port at 25 which provides about 5 volts DC and 0.01 to 0.3 amps DC of electric power for standard input/output peripherals such as a computer mouse or an extra keyboard on typical PPCs such as laptops, notebooks and PDAs. In this FIG. 1C arrangement of cables, both data signals and electric power are transmitted by means of the data/power cable 3 attached to the GPS receiver 2.

Figure 2A:
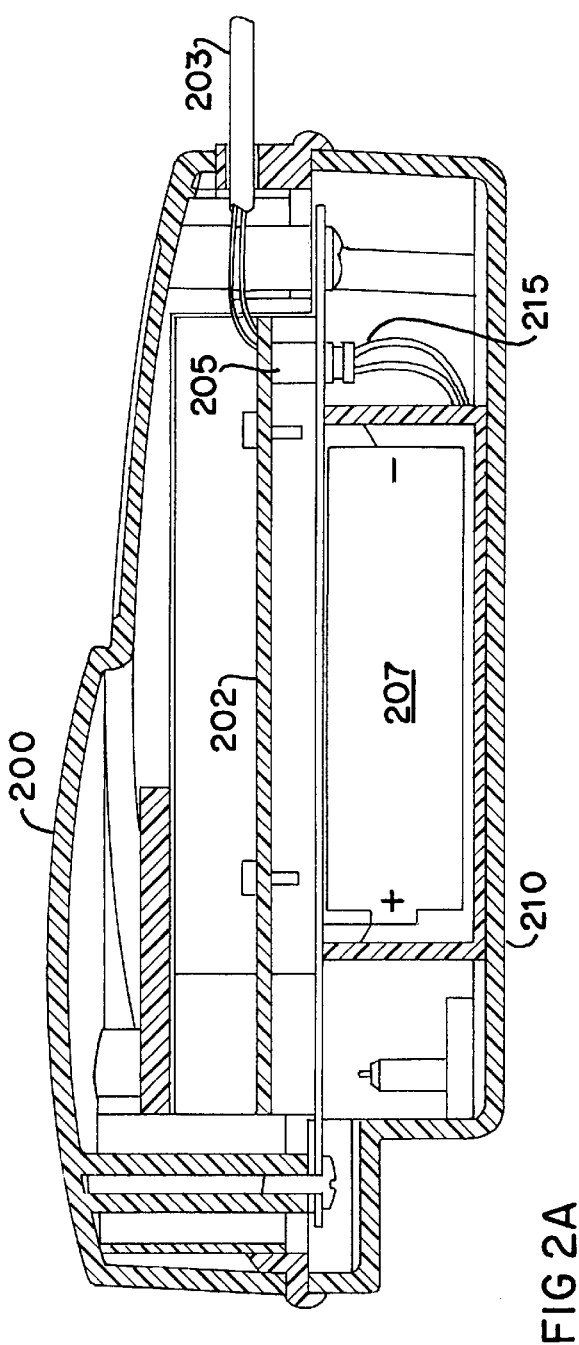
FIG. 2A is a side view of the GPS receiver with the removable standard battery power base or bottom cover.
Figure 2B:
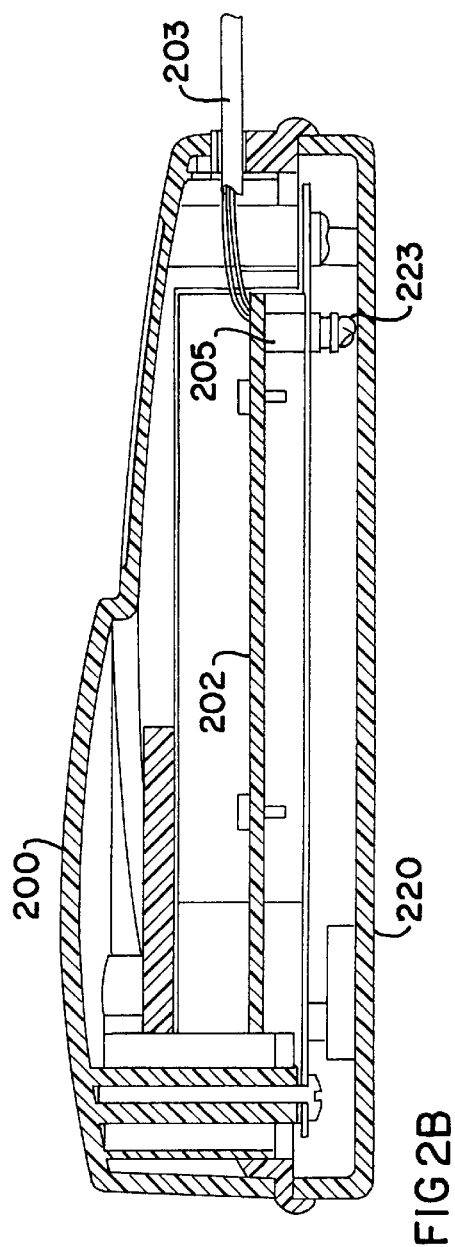
FIG. 2B is a side view of the GPS receiver with the optional removable external power base or bottom cover.

FIGS. 2A and 2B present side views of the GPS receiver 2 according to the present invention. FIG. 2A shows the GPS receiver 2 with a removable standard battery power base 210 or bottom cover, while FIG. 2B shows an optional removable external power base 220 or bottom cover.

FIGS. 2A and 2B show several common GPS receiver features such as a top cover or outer case 200, a GPS printed wiring board (PWB) 202 comprising the essential integrated circuits of the GPS receiver 2, an attached standard data/power cable 203 (also shown heretofore at 3 in FIGS. 1A, 1B and 1C), and a power supply trunk 205 or three-position male connector for electrical power to the PWB 202, as further detailed in FIG. 5A hereinafter.

FIG. 2A includes a side view of the standard battery power base or bottom cover 210 in which standard "AA" or equivalent sized replaceable retail batteries 207 are installed providing electric power to the PWB 202 through typical wiring and/or connections as shown at 215 and 205. The wiring and connection of the standard battery base 210 shown in FIG. 2A are further detailed hereinafter in relation to FIG. 5B.

FIG. 2B is a side view of the optional external power base or bottom cover 220, which is installed to provide external power to the GPS receiver 2, by means of an external power jumper 223. For example, this external power jumper 223 may preferably be a three-position female connector as described in more detail relative to FIG. 5C hereinafter. FIG. 2C illustrates a preferred design of the external jumper 223, in which power coupling 243 is designed to couple to three-position female connector 543 shown in FIG. 5C.

FIGS. 3A and 3B present further details pertaining to the first type of optional cable or connection shown more generally heretofore as cable 10 in FIG. 1B. In FIGS. 3A and 3B, one DB-9 female connector 311 corresponds to the connector 11 in FIG. 1B for the PPC COM port. In FIGS. 3A and 3B, data 310 and power 309 sides of the cable 10 arrangement are joined in a "Y" configuration at the GPS end or connector 313, specified as a DB-9 male connector, and corresponding to coupling 13 in FIG. 1B. An external power coupling 312 in FIGS. 3A and 3B, may be a dual-leaf cigarette lighter plug, corresponding to plug 12 in FIG. 1B. In the FIG. 3B schematic wiring diagram, a 12-volt DC to 9-volt DC power converter/filter/regulator 315 is further specified and built into the cigarette lighter plug 312 such that, for example, no more than 9 volts DC and 200 milliamps is provided by means of the cigarette lighter plug 312 to the GPS receiver 2. Connector detail in FIG. 1B is shown from the crimp/solder side; other pins are loaded but not connected; at 310 and 309, 28 AWG wire is specified. Other features shown in FIGS. 3A and 3B will be quite obvious to one skilled in the art.

Figure 4A:
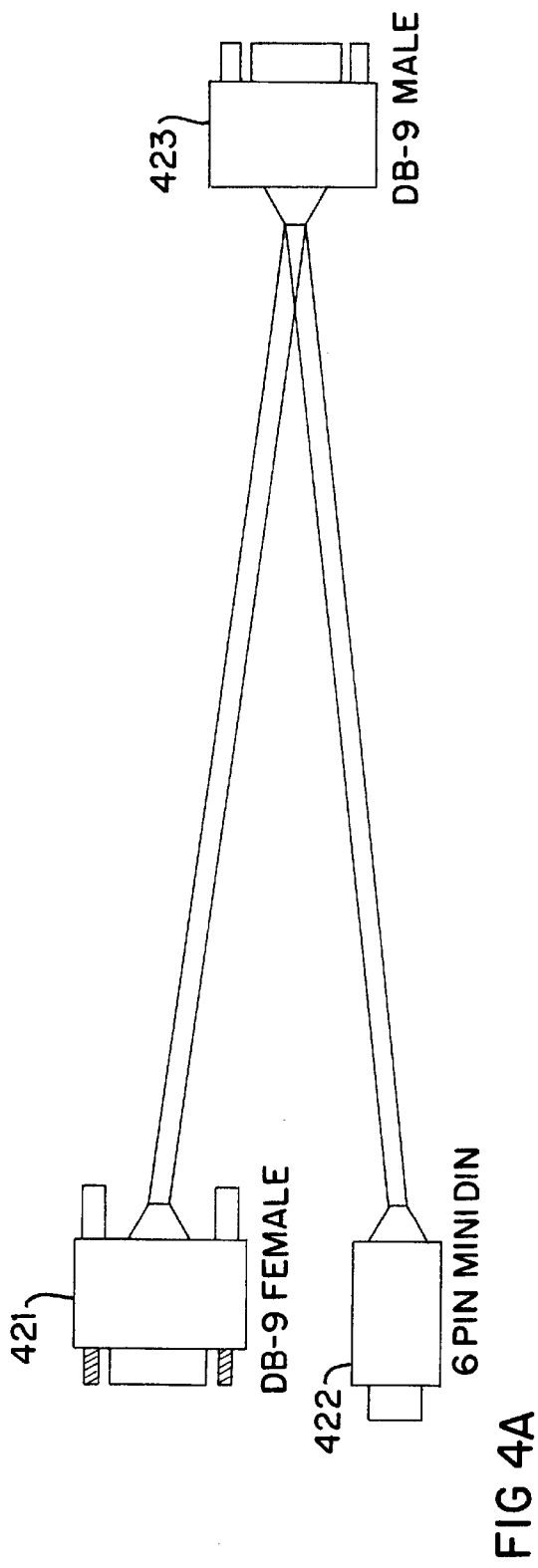
FIG. 4A is an external physical layout of the second type of optional accessory cable and fittings to get power for GPS from mouse/keyboard port on the PPC.
Figure 4B:
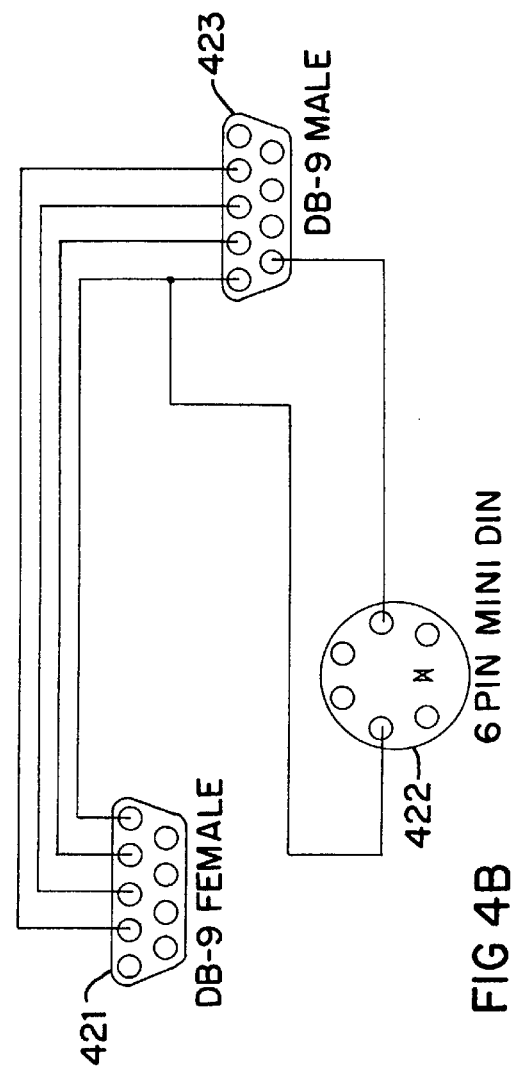
FIG. 4B is a schematic wiring and pin diagram of the second type of optional accessory cable and fittings shown in FIG. 4A.

FIGS. 4A and 4B illustrate further details of the second type of optional cable for connecting the PPC 1 and the GPS receiver 2, corresponding to cabling 20 in FIG. 1C. In FIGS. 4A and 4B, a COM port connector 421 (specified as a DB-9 female) and a keyboard/mouse connector 422 (specified as a 6-pin mini DIN fitting) correspond to components 21 and 22 respectively in FIG. 1C. The COM port data cable and the keyboard/mouse port power cable join in a "Y" configuration in FIGS. 4A and 4B at 423 (specified as a DB-9 male connector) which corresponds to location 23 in FIG. 1C. Other features shown in FIGS. 4A and 4B will appear obvious to one skilled in the art.

FIGS. 5A, 5B and 5C present physical layouts showing an overview of a GPS receiver printed wiring board or PWB 505 in a GPS case 502, and a standard battery power base at 531, and an optional external power base 539, respectively. The GPS receiver case 502 was shown heretofore at 2 in FIGS. 1A, 1B and 1C, and at 200 in FIG. 2A. The PWB 505 was shown at 202 both in FIGS. 2A and 2B. The standard battery power base 531 was shown at 6 in FIG. 1A and at 210 in FIG. 2A. The external power base 539 was shown in less detail at 15 in FIGS. 1B and 1C, with a detailed side view presented at 220 in FIG. 2B. As should be obvious to a skilled technician from all these drawings, the 531 standard battery power base and the 539 optional external power base involve alternate bottom covers for the GPS receiver case at 502 in FIGS. 5A, 5B and 5C.

FIG. 5A shows an attached GPS data/power cable 503, corresponding to cable 3 in FIGS. 1A, 1B and 1C and cable 203 in FIGS. 2A and 2B. In relation to FIG. 5A, 504 is specified as a DB-9 female connector; 507 is Data Out; 509 is Data In; 511 is Data Terminal Ready; 513 is Power Ground/Signal Reference; and 515 is DC Power In. 517 is the Power Ground; 519 is External Power; and 521 is Battery Power In—feeding a three-position male power supply trunk 525 in FIG. 5A. The other features shown in FIGS. 5A, 5B and 5C will appear obvious to one skilled in the art.

With continuing reference to the coupling of the power supply components of the present invention shown in FIGS. 5A–5C, there is specified a power supply trunk that is shown preferably as a three-position male connector 525 corresponding to the power supply trunk 205 for the PWB 202 as shown in FIGS. 2A and 2B. The three-position male connector 525 mates with a three-position female connector or jumper 533 for the standard battery power base in FIG. 5B, and also mates with an identical, identically placed but differently wired three-position female connector 545 on the external power base 531 in FIG. 5C. Thus, whether an internal battery or an external power is provided to the GPS receiver PWB board 505 is determined by the power base chosen and installed by the user—in conjunction with positive (+) 535 and negative (−) 537 battery power lines in FIG. 5B or the external power jumper at 543 in FIG. 5C. That is, when the standard battery power base 531 is coupled to the GPS receiver case 502, internal power is supplied to the GPS receiver 2 through the coupling of positive terminal 535 to terminal 521 and negative terminal 537 to terminal 517, with terminal 519 left open. On the other hand, when the external power supply case 539 is coupled to the GPS receiver case 502, external power through connection 515 is supplied to the GPS receiver 2 through the coupling of terminals 519 and 521 to the terminals of external power jumper 543.

The invention description herein is directed to a specific embodiment, however, it is apparent that many modifications and variations could be implemented by one skilled in the art without departure from the spirit and scope of the novel concepts of the present invention.

I claim:

1. A system for exchanging data between a global positioning system (GPS) receiver and a computer means for supplying power to the GPS receiver, the system comprising:

a. a computer device including a data exchange port and a power-providing port selected from the group consisting of a mouse port, a keyboard port, and a combination mouse/keyboard port;

b. a GPS receiver device; and c. an interface cabling system coupled to said GPS receiver device and means for coupling to said data exchange port and said power providing port of said computer device, wherein said interface cabling system provides for an exchange of data between said computer device and said GPS receiver device, and wherein said interface cabling system provides for powering of said GPS receiver device by said computer device.

2. The system as claimed in claim 1 further comprising an adaptive removable power supply base attachable to the GPS receiver device.

3. The system as claimed in claim 1 wherein said interface cabling system includes:

a. a first cable coupled to said GPS receiver device; and b. a second cable having a first coupling end for coupling to said first cable, and a second coupling end including a data coupling cable that is said means for coupling said GPS receiver device to said data exchange port, and a power coupling cable having an adaptive end for coupling said GPS receiver device to said power providing port of said computer device.

4. The system as claimed in claim 3 wherein an adaptive end of said data coupling cable is a DB-9 female connector and said first coupling end of said second cable includes a DB-9 male connector for coupling said second cable to said first cable, and wherein said adaptive end of said power coupling cable is a 6-pin mini DIN fitting.

* * * * *